May 20, 1941. L. F. PARKER ET AL 2,242,596

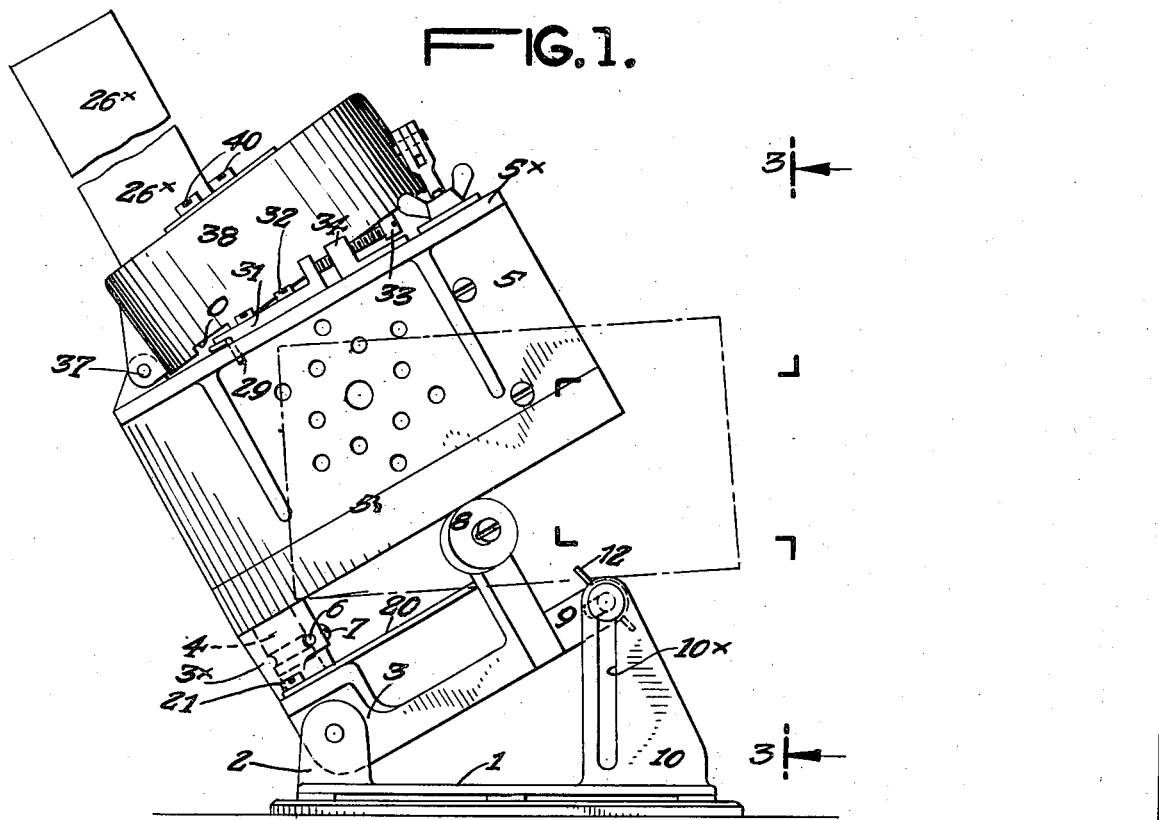

TARGET THROWING APPARATUS

Filed Oct. 21, 1938 5 Sheets-Sheet 2

INVENTOR.
Laurie F. Parker and
Arnold Hauger
BY H. Lee Helm
ATTORNEY.

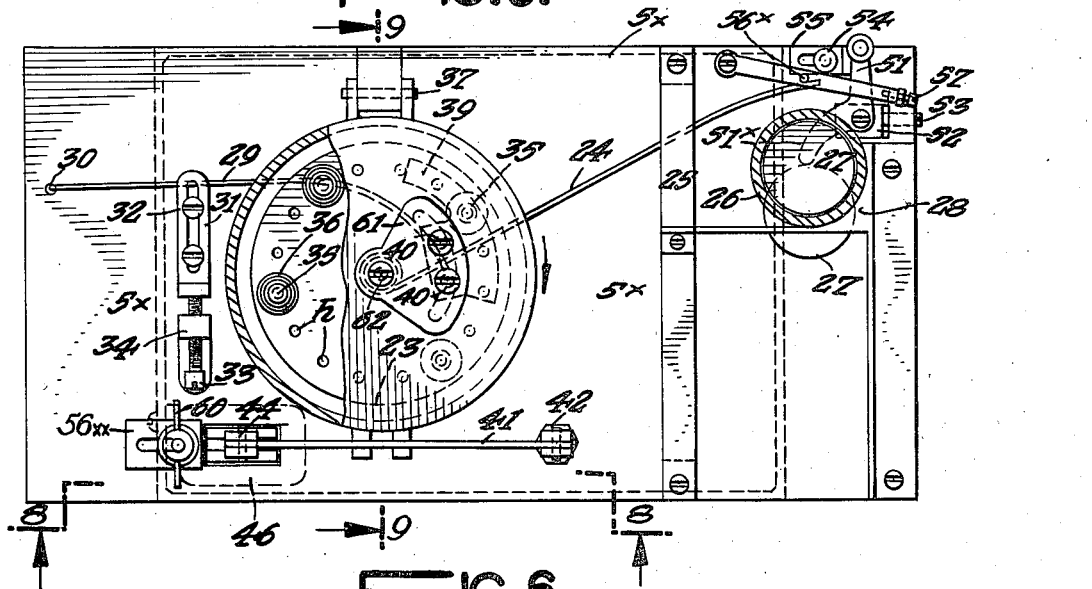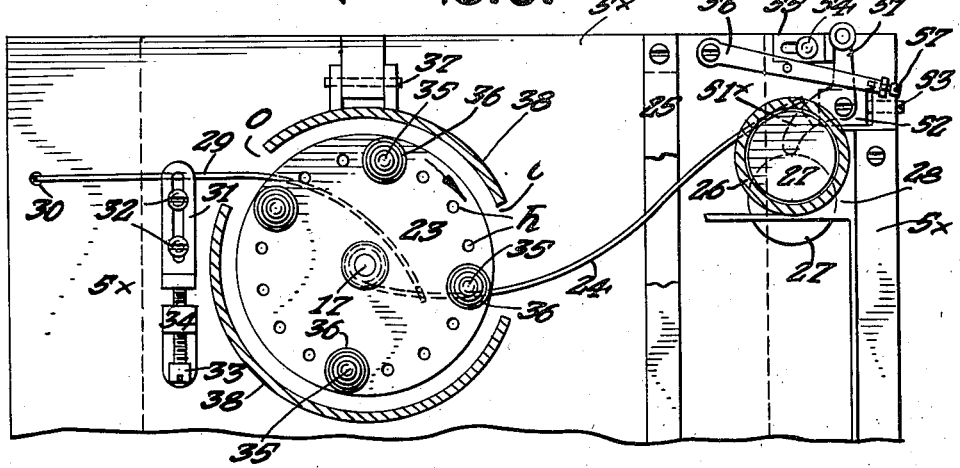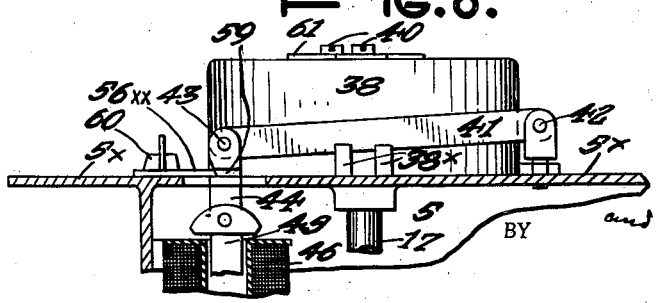

May 20, 1941.                L. F. PARKER ET AL                2,242,596
                         TARGET THROWING APPARATUS
                        Filed Oct. 21, 1938        5 Sheets-Sheet 4
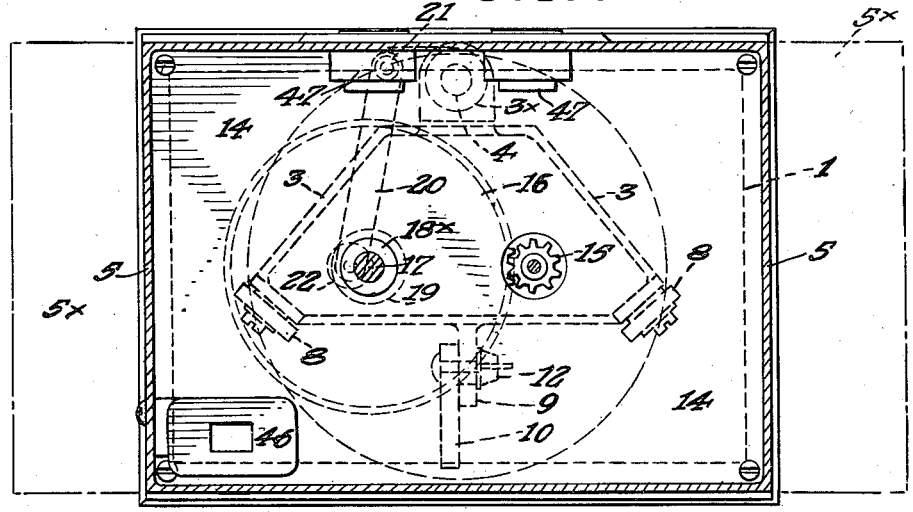
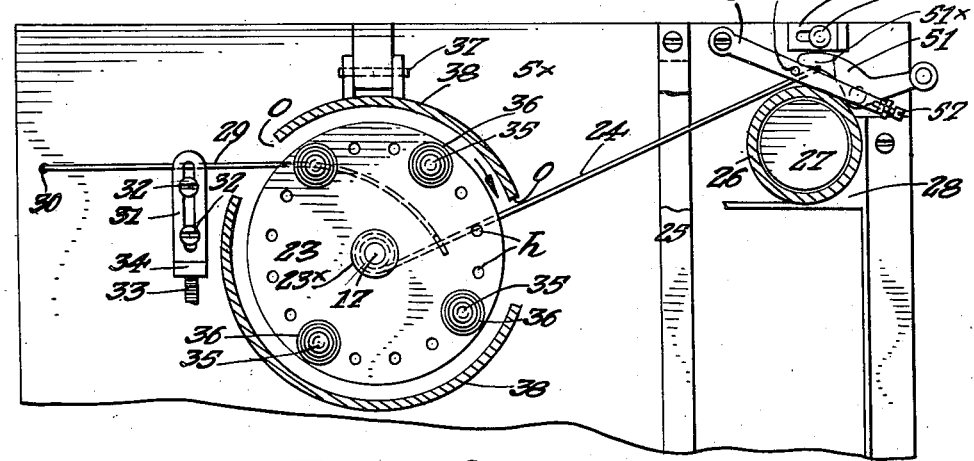
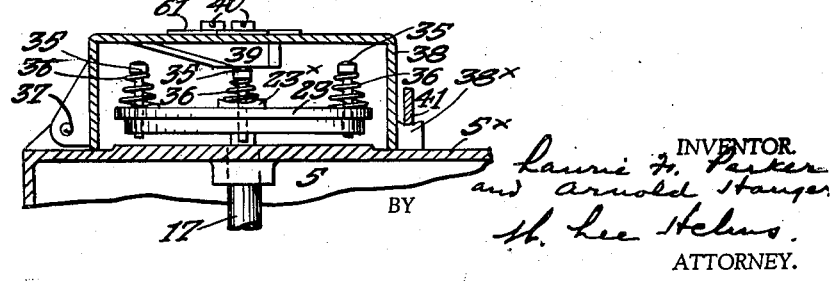

Patented May 20, 1941

2,242,596

UNITED STATES PATENT OFFICE 2,242,596

TARGET THROWING APPARATUS

Laurie F. Parker, Noroton, Conn., and Arnold Hanger, Richmond, Ky.

Application October 21, 1938, Serial No. 236,172

10 Claims. (Cl. 124—8)

The object of the present invention is to provide a simple and inexpensive form of target throwing apparatus adapted for clay, composition or wooden targets of any size, including the clay targets used in "skeet" shooting, and the relatively small wooden, clay or composition targets used with shot cartridges of small caliber down to 22 caliber.

The specific objects of the invention are to provide a target throwing device which may have a wide variety of adjustment to meet various conditions, including adjustment in the angles, height and lateral spread of the target flights, which provides for varying the power of the target throwing structure for alterations in the speed of the target flight, which employs an exceedingly simple and readily replaceable target striker, which enables ready change in the number of targets thrown in each cycle of movement of the apparatus to increase or decrease the period of time between successive target flights, which enables operation of the device by the marksman himself as by foot pressure upon a controlling switch in such manner that the marksman may effect any desired number of successive target flights and the time at which one or a plurality are instituted.

The invention will be described with reference to the accompanying drawings, in which:

Figure 1 is a view of an embodiment of the apparatus in side elevation, dotted lines showing a lowered position of the primary casing.

Figure 2 is a vertical section through the primary casing illustrated in Figure 1.

Figure 5 is a plan view of the apparatus, the target being shown in section and the cam-cap being partly broken away, certain members being shown in dotted lines.

Figure 6 is a plan view, partly in section, showing the position of the target striker wire shortly prior to an active striking movement thereof.

Figure 7 is a view similar to Figure 6, showing the position of the striker wire immediately following an active movement thereof and preliminary to the automatic resetting of its control cam.

Figure 8 is a fragmentary vertical section on the line 8—8, Figure 5.

Figure 9 is a fragmentary vertical section on the line 9—9, Figure 5.

Figure 10 is a horizontal section on the line 10—10, Figure 3.

Figure 11 is an enlarged detailed view of the operating disk for the arm for oscillating the primary casing, showing means for changing the eccentric mounting of the arm on the disk.

Figure 12 is a perspective view of the pivoted detent.

Figure 3:
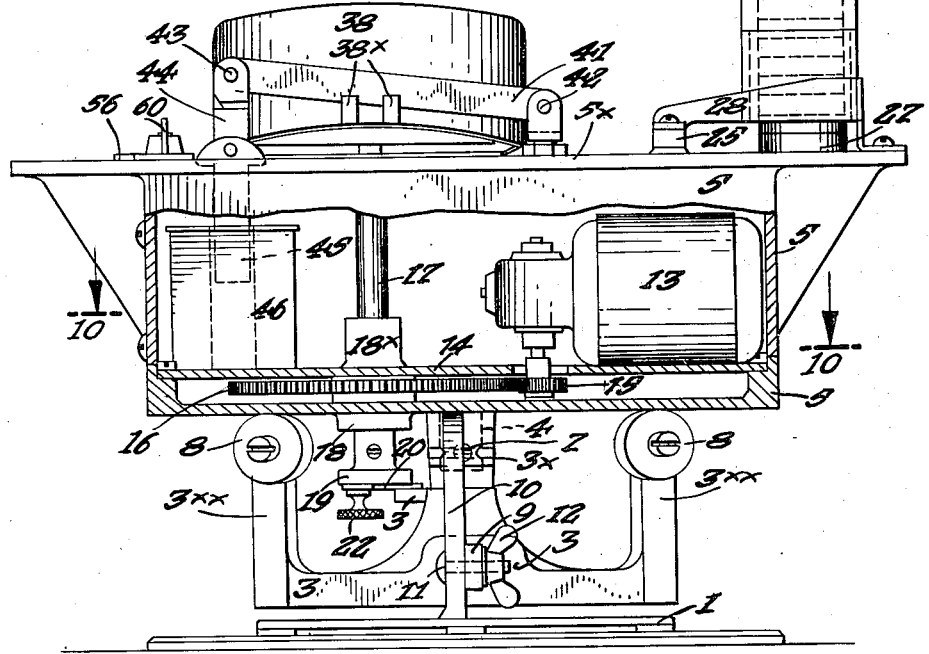
Figure 3 is a view in front elevation, partly in section, the section being taken on the line 3—3, Figure 1.

Referring to the drawings, we have illustrated at 1 a base member from which rises two spaced pivot supporting arms, one of which is shown at 2, Figure 1. Between the arms 2 is pivoted a bracket member 3. This bracket member is formed with an upstanding socket extension $3x$ which receives the pivot post 4 depending from rectangular casing 5. Post 4 may be held in position by a pin 6 which passes through socket extension $3x$ for the purpose of entering a groove surrounding post 4. The pin may be held in position by set screw 7. Bracket 3 is formed with the upwardly extending arms $3xx$ provided with anti-friction rollers 8 upon which casing 5 rests and oscillates.

For adjustment of the angular position of the casing 5, bracket 3 is formed with an arm 9 which lies adjacent flat vertical plate 10 carried by the base number 1, the plate being formed with a vertical aperture at $10x$ to receive a headed stud 11, the threaded end of the stud passing through arm 9 and receiving a wing nut 12. Thus bracket 3 may be moved from the position of Figure 3 to that of Figure 1, and to intermediate positions, being held at its point of adjustment by the clamping action of the wing nut 12.

Oscillation of the casing

The casing is given a swinging movement or oscillation from side to side. For this purpose there is disposed within the casing a motor 13 which may rest upon a division plate 14. The motor drives, through suitable connections, a pinion 15 in mesh with a gear wheel 16 on a shaft 17, the shaft being guided in bearing members 18, $18x$, the latter bearing member being carried by division plate 14.

To the lower end of the shaft 17 is fixed a disk 19 shown in detail in Figure 11. The underface of disk 19 is formed with a plurality of threaded apertures spaced each a different distance from the axis of shaft 17. An arm 20 is fixed at one end to bracket 3, by screw 21. The opposite end of arm 20 carries a screw having at its outer end a knurled thumb wheel, the screw being indicated at 22. The screw 22 may be threaded in any one of the threaded apertures a, b, c, of disk 19. Therefore, as shaft 17 rotates, the corresponding rotation of disk 19 will exert leverage upon the casing through the instrumentality of arm 20, and a swinging movement of the casing is effected, the degree of the swinging movement being determined by the distance of screw 22 from the axis of the said disk 19.

The top plate of the casing 5x, is apertured so that shaft 17 projects therethrough, and the reduced upper end of shaft 17 receives the apertured hub 23x of a striker operating disk 23.

*Construction of the striker disk and striker mechanism*

Striker disk 23 is formed with a plurality of annularly arranged apertures which extend entirely through the disk, shown more particularly in Figures 5, 6 and 7. The action of pinion 15 on gear wheel 16 is to impart constant rotation to shaft 17 and hence to the striker operating disk.

Encircling shaft 17 below disk 23 is one end of the striker spring 24. The spring extends under disk 23 radially thereof and thence under a guide bar 25 carried by the casing top plate 5x. The outer end of the striker spring is in such position that when the spring is given bodily movement and forwardly, it will sweep under a target chute 26. The target chute is a tube which may receive a tubular reservoir 26x containing the target disks 27. In the present embodiment, tube 26 is annular in cross section, but in practice, it may be of any desired formation. The target chute formed by tube 26 is held elevated above casing plate 5x by means of a bracket 28 to which the chute may be welded or otherwise secured. By this arrangement, the lowermost target 27 will drop down to a point of rest on casing plate 5x and its top will clear the base of the chute, and will be ready for ejection by the striker spring.

The striker spring is normally held in the position of Figure 5 by the action of a tie-spring 29. One end of the tie-spring passes through an opening at 30 in casing top plate 5x and the opposite end of the tie-spring is looped about the striker spring 24 after passing into engagement with an adjustable fulcrum bar 31. The fulcrum bar is formed with an elongated slot to receive guide studs 32 and the bar may be adjusted by means of a set screw 33 threaded in an arm 34 fixed to plate 5x.

In the holes h of striker disk 23 may be placed any desired number of headed pins 35 which are normally held upward in inoperative position by coil springs 36. The pins 35 are utilized to impart operative tension and movement to the striker spring 24.

*The throw-in means for the actuator pins*

Figure 4:
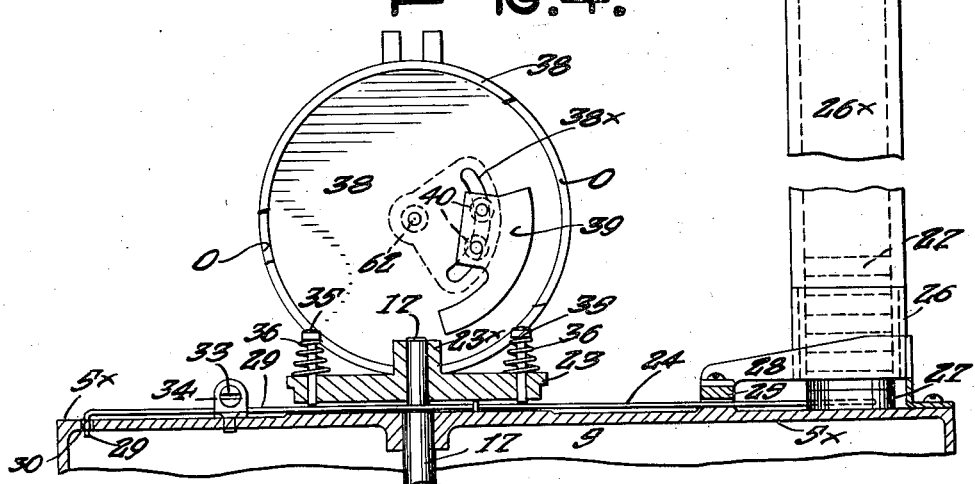
Figure 4 is a vertical section of the casing top plate and certain members immediately supported thereby, the cam-cap being raised so as to lie in inoperative position.

Hinged at 37 on casing plate 5x is a cam-cap 38, the lower wall margin of the cap being cut away at opposed points o to afford clearance for the striker and tie-spring. On the underface of cap 38 is adjustably secured a cam 39, so that as striker disk 23 rotates the heads of pins 35 will successively be engaged by the cam and the pins in succession will be moved down into operative position. For purpose of adjustment of the cam, the cam-cap 38 is formed with an arcuate slot at 38x (Figure 4) and the cam is secured by set screws 40 which pass through the slot and serve to hold the cam in the desired position.

Unless cap 38 is held in lowermost position at the time a pin 35 meets cam 39 the tension of the spring 36 appropriate to the pin will not be overcome and the cam will merely ride over the pin to cause a corresponding rise and fall of cap 38. In order to hold cap 38 down in operative position for the action of one or a succession of pins, cap 38 is provided with laterally projecting lugs 38x over which is positioned a latch bar 41 having one end pivoted at 42 (Figure 3) and its opposite end pivoted at 43 to a link 44, in turn pivoted to a solenoid core 45 in the cavity of a solenoid 46.

Referring to Figure 2, it will be seen that there is mounted on casing 5 a junction box 47 which will have a plug socket to receive plug 48 of an electric conduit 49 which will lead to a suitable switch, preferably a foot-pressure switch, which may be located at any desired distance away from the device. The junction box is connected to a cable 50 leading to the solenoid.

When the solenoid is energized the core will pull down latch bar 41 and will hold the same until the foot pedal switch, if such a switch is used, is released to break the circuit. This action will hold down cam-cap 38 for the desired interval of time and either for a single target projection or for a plurality of such projections.

In Figure 5 a pin, indicated by the numeral 35, is shown as engaged by cam 39 and approaching the striker spring 24. In the position of the parts shown in Figure 6, the pin has bent the striker spring and has imposed such tension thereon as to make the same ready for a strong striking blow upon the lowermost target disk 27. The action of the pin has been resisted by a pivoted detent 51, the detent being pivoted upon a slide block 52, movable in a guide channel formed in the casing top plate 5x and adjustable by means of a screw 53 passing through said plate as shown in Figures 5 and 6. The construction of this detent is best shown in Figure 12. While the spring is receiving the tension action of the appropriate pin 35, it lies below the relatively thin finger 51x of the detent but against the thicker cam-like area of the detent rearwardly of the finger 51x. In the continued movement of the said striker spring 24, its end passes the effective holding area of the detent and immediately it whips into contact with the target disk with a strong propelling force, throwing it outwardly and upwardly a height predetermined by the tension of the spring and the length of its stroke.

The timing of the stroke is adjusted by the position of the pivoted detent 51. Thus if the timing is advanced, the force of the stroke is proportionately less, and vice versa. In the position of the parts shown in Figures 5 and 6, the timing is retarded to the maximum. To advance the timing and lessen the power of the stroke, it is only necessary to loosen set screw 54 which passes through an elongated aperture in adjustment block 55 and then move the block to the right from its position in Figures 5 and 6. Block 55 serves as an abutment for one face of the pivoted detent 51, and such adjustment will move the detent so that its effective holding face for the striker spring 24 will be retracted relatively to the said spring.

*The return of the striker spring to initial position after a power stroke*

As shown above the tension imparted to striker spring 24 imposes a tension upon tie-spring 29. Therefore, after a power stroke, tie-spring 29 acts to return striker spring 24 to initial position. In the position of the parts shown in Figure 7, the striker spring has been moved back to initial position. In such movement its end has come into contact with a pin 56x carried by pivoted pawl arm 56, the return of the striker spring having first pushed pivoted detent 51 into clearance position and hence out of operative position, as clearly indicated in Figure 7. The contact of pin 56x by striker spring 24 will cause outward movement of the arm 56 which, in turn, will engage pivoted detent 51 and restore it to the position of Figure 5. The outer end of pawl arm 56 may be bent downwardly and the bent section may receive an adjustment screw 57 which may be the immediate member of the arm which engages the pivoted detent 51, as will be understood without further explanation.

As the spring returns and therefore throws the pivoted detent into inactive position, the finger 51x of the detent is moved from under the chute 26, momentarily, and the superposed body of target disks drops so that the lowermost disk rests upon casing top plate 5x. The action of pawl arm 56 under the influence of striker spring 24 promptly restores the initial position of the pivoted detent and its finger moves the lowermost target disk to the position of Figures 5 and 6, ready for the striking action of spring 24.

*Holding of the stack of targets during a power stroke*

The movement of the pivoted detent in positioning the lowermost target for the action of the striker spring carries the finger 51x of the detent under the stack of targets above said lowermost target and hence supports the same as the lowermost target is propelled outwardly by the striker spring.

*General provisions*

When it is desired that the striker disk 23 operate continuously, the desired number and spacing of spring-engaged pins 35, are placed in apertures of the striker disk 23, the cam 38 is moved downwardly to closed position and a short locking bar 56xx (Figures 5 and 8) is moved in position to engage the lower wall of a channel at 59 formed in link 44 above solenoid core 45. The locking bar 56 is formed with an elongated aperture into which projects a stud carried by top plate 5x, the stud being threaded to receive a thumb nut 60 by which the locking bar is held in position. In this manner the cam-cap 38 remains in active position during the rotation of the striker disk.

The set screws 40 which hold the cam 39 in its adjusted position in cam-cap 38 may pass through a plate 61 on the upper surface of the cam-cap, the plate covering the elongated slot in the cap through which the set screw 40 projects. Cap 61 may receive a holding screw 62 (Figure 5).

*General operation*

As stated above, the wiring leading to the solenoid via junction box 47 (Figure 2) may communicate via wire 49, or both negative and positive wires at 49, to a point remote from the apparatus so that an attendant may, by depression of a foot switch or hand switch, so control the apparatus as to eject the targets at the command of the marksman. Or the marksman may, himself, depress a foot switch, at the time desired, in order to close and open the circuit through the solenoid to control the ejection of the targets as he wishes.

The timing of the target ejection and the number of ejections in any given time may be controlled not only by a foot or manual switch remote from the apparatus, but by the number and spacing of the striker pins 35 in the striker disk 23, or by both expedients in conjunction. The lateral range of the propelled targets is changed as desired by the adjustment of arm 20 toward or from the axis of shaft 17 as described above, and the elevation of the targets at the end of their upward flight may be controlled by the vertical adjustment of bracket 3. The force of the striker spring, and hence the distance and speed of the propelled target is controlled by adjustment of block 52. It will also be understood that the adjustment of cam 39 provides additional change in the timing of ejection of the targets.

The construction is such that change, i. e., replacement, of striker springs is readily effected by loosening set screw s (Figure 2), then withdrawing the striker disk 23 from its shaft 17 to permit removal of the striker spring in the apparatus for its replacement with a new striker spring of the same or a greater, or less, resistance.

Figure 13:
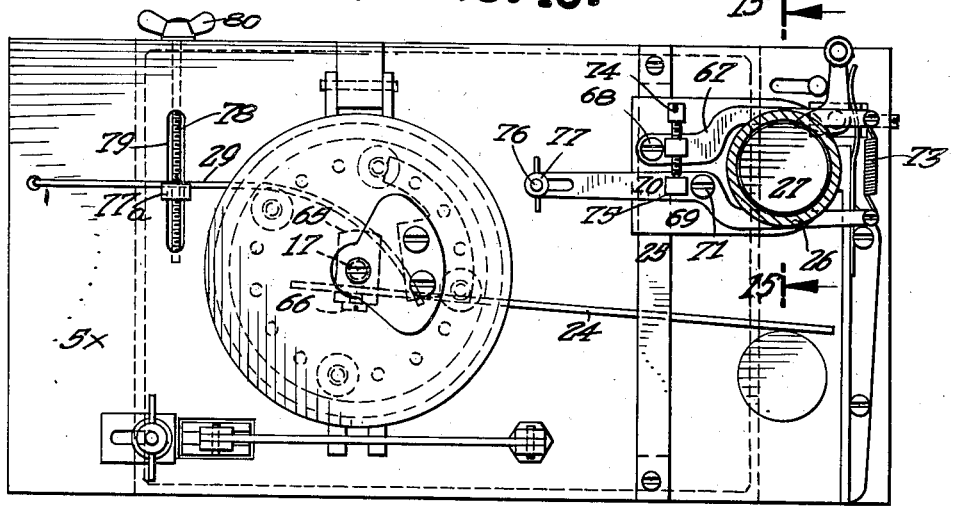
Figure 13 is a plan view, partly in section and partly in dotted lines, showing a modified form of spring-holding arrangement and stack-holding fingers, the throwing spring being toward the end of an operative movement.
Figure 14:
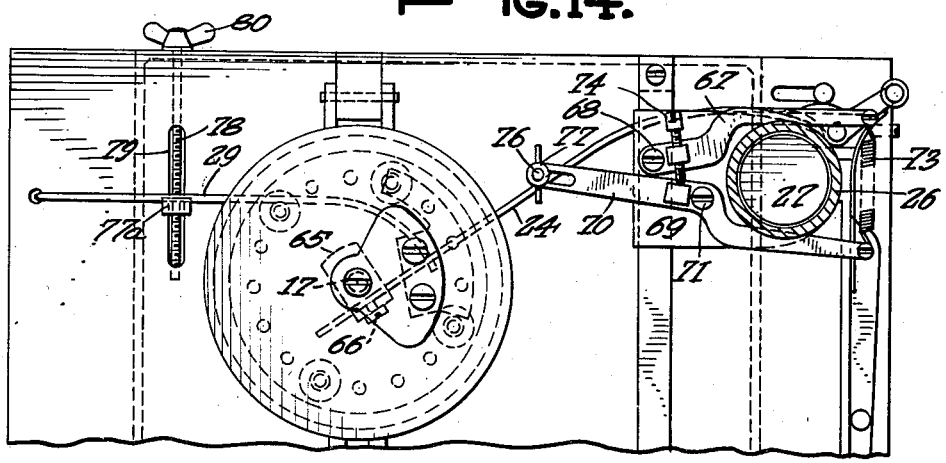
Figure 14 is a similar view with the operating spring at the instant of an operative movement.
Figure 15:
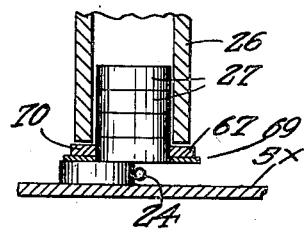
Figure 15 is a fragmentary vertical section through the lower portion of the target holding tube and associated parts.

In the modified construction shown in Figures 13, 14 and 15, the target is initially held by the finger ends of two levers 67 and 70, the first lever being pivoted at 68 and the second lever at 71. The outer ends of the levers are connected by means of a coiled spring 73 tending to move them inwardly and into holding position; that is to say, the position shown in Figure 15 wherein a plate 69 is shown immediately below levers 67 and 70, the levers being pivoted to said plate and the plate being apertured to permit passage of the targets to support 5x.

Threaded in a lug carried by lever 67 is an adjustable screw 74 the outer end of which bears upon a lug 75 carried by lever 70. Lever 70 is provided with an extension having a slotted end which receives a stud 76 projecting below the lever and which has a head. The threaded upper end of the stud receives a wing nut 77 by means of which the stud may be clamped in position. The downwardly projected lower end of the stud is adapted to be struck by the striker spring 24 when the latter is moved from the position of Figure 13 to the position of Figure 14 after propulsion of a target lying on support 5x. In such return movement of the spring the target above the one which has been propelled is held by the finger ends of levers 67 and 70 in the manner shown in Figure 15 and the striker spring moves back freely under said held target. Toward the end of such movement the striker spring engages the depending stud of lever 70 and the levers are moved to the position of Figure 14, lever 70 being positively moved by the striker spring and lever 67 through the engagement of lug 75 with the end of screw 74 and the continued action of the device is exactly the same as that previously described with reference to the structure shown in the figures preceding Figure 13.

Having described our invention, what we claim and desire to secure by Letters Patent, is as follows:

1. A target throwing apparatus comprising positioning means, a striker spring, fulcrum means for one end of the spring, an abutment for the opposite end of the spring, means for deflecting the spring upon said abutment for imparting a tension to the spring, said means comprising a movable member, a spring-engaging device carried by said movable member, a spring normally holding the spring-engaging device in inoperative position, and a cam for moving the spring-engaging device into operative position, said spring-engaging device being adapted to engage the spring intermediate said abutment and the spring supporting means to effect said tension of the spring and to cause the spring under tensioned deflection to deflect past the abutment and strike the target.

2. A target throwing apparatus comprising target positioning means, a striker spring, fulcrum means for one end of the spring, an abutment for the opposite end of the spring, means for deflecting the spring upon said abutment for imparting a tension to the spring, said means being adapted to engage the spring between said abutment and said fulcrum means to effect said tension of the spring and to cause the spring under tension to deflect past the abutment and strike the target, said means for deflecting the spring comprising a movable member formed with a plurality of apertures, pins in said apertures, springs normally holding the pins in inoperative position, and a cam device for successively moving the pins into operative position.

3. A target throwing apparatus comprising target positioning means, a striker spring, an abutment for one end of the spring, and means for deflecting the spring upon said abutment for imparting a tension to the spring, said means being adapted to move the spring from said abutment at the end of the deflecting movement to cause the spring under tension to strike the target, said means for deflecting the spring comprising a rotary disk formed with a plurality of annularly arranged apertures, pins in said apertures, cam and spring devices for moving the pins into and out of operative position, a movable cam supporting member, and means acting upon said member to control active and inactive positions of the cam device.

4. A target throwing apparatus constructed in accordance with claim 7, in combination with an electric circuit, a solenoid in said circuit, a switch for opening and closing the circuit, and means operated by said solenoid for controlling the cam supporting member.

5. A target throwing apparatus comprising target positioning means, a striker spring, an abutment for one end of the spring, and means for deflecting the spring upon said abutment for imparting a tension to the spring, the target positioning means being adapted to support a stack of targets and the striker spring being arm-like in formation and the abutment being pivotally supported, a finger on said abutment, and pivoted abutment actuating member adapted to be struck by the striker spring in a return movement of the latter after a striking movement whereby the pivoted abutment is given a movement to carry its finger into engagement with a target positioned by said target positioning means and effecting a preliminary movement of said target under an overlying target, thereby positioned upon said finger.

6. A target throwing apparatus constructed in accordance with claim 4, in combination with an electric circuit, a solenoid in said circuit, a switch for opening and closing the circuit, means operated by said solenoid for controlling the cam supporting member, and means for holding the cam-supporting member in operative position independently of the solenoid device.

7. A target throwing apparatus comprising target positioning means, a striker spring, an abutment for one end of the spring, and means for deflecting the spring upon said abutment for imparting a tension to the spring, said means being adapted to move the spring from said abutment at the end of the deflecting movement to cause the spring under tension to strike the target, said means for deflecting the spring comprising a rotary disk, a plurality of apertures annularly arranged in said disk, a plurality of pins in said apertures, spring means engaging the pins, a pivoted cam-cap, a cam carried within the cap, means for locking the cap against pivotal action and comprising a lever adapted to engage the cap, a solenoid core operatively connected to the lever, and an electric circuit with which the solenoid is operatively connected, whereby opening and closing the circuit will effect actuation of said lever.

8. A target throwing apparatus constructed in accordance with claim 7, in combination with means for adjusting the position of the cam relatively to the cam-cap to vary the time of action of the cam upon the pins.

9. A target throwing apparatus comprising target positioning means, a striker spring, an abutment for one end of the spring, means for deflecting the spring upon said abutment for imparting a tension to the spring, said last named means comprising a rotary disk formed with a plurality of seats, a plurality of spring-engaging finger devices disposed in certain of said seats, said devices being capable of manual movement from one seat to another to vary the number and the relative spacing thereof at will, and means acting upon said spring-engaging devices to successively move them into and out of operative relation to the striker spring during the rotation of the disk.

10. A target throwing apparatus comprising a frame, a bracket pivoted on said frame for vertical adjustment, a casing pivoted upon the bracket for oscillation, a shaft vertically mounted in the casing and projecting at the top and at the bottom thereof, means carried by the shaft at its bottom projection for oscillation of the casing, a disk carried by the shaft at its upper projection, the disk being formed with a plurality of annularly arranged apertures, pins in said apertures, a spring normally holding each pin in an upper position, a cam-cap pivoted to the casing and normally encompassing the disk and pins, a cam carried by the cap and adapted to successively depress the pins during the rotation of the disk, a striker spring supported at one end, a movable abutment for the opposite end of the spring, the spring intermediate its length being positioned for engagement by said pins, a target stack-holding device adjacent said movable abutment, a finger carried by the abutment, and an actuator for the movable abutment active upon contact thereof by the spring in a return movement of the latter after a target-striking movement.

LAURIE F. PARKER.
ARNOLD HANGER.